United States Patent [19]

Lake

[11] Patent Number: 4,487,077
[45] Date of Patent: Dec. 11, 1984

[54] ELECTRIC REMOTE READOUT FOR FLUID FLOW METER

[75] Inventor: Jack E. Lake, Racine, Wis.

[73] Assignee: Racine Federated Inc., Racine, Wis.

[21] Appl. No.: 494,792

[22] Filed: May 16, 1983

[51] Int. Cl.³ .............................................. G01F 1/24
[52] U.S. Cl. .............................. 73/861.58; 73/DIG. 5
[58] Field of Search ........... 73/861.53, 861.54, 861.58, 73/861.56, 313, DIG. 5

[56] References Cited

U.S. PATENT DOCUMENTS

| Re. 25,208 | 7/1962 | Perkins .................................... 73/313 |
| 1,499,839 | 7/1924 | Nicholson . |
| 2,325,884 | 8/1943 | Schorn . |
| 2,459,689 | 1/1949 | Dickey et al. . |
| 3,204,452 | 9/1965 | Sorenson et al. ............. 73/861.54 X |
| 3,218,853 | 11/1965 | Ongaro . |
| 3,253,459 | 5/1966 | Sorenson et al. ............. 73/861.54 X |
| 3,398,305 | 8/1968 | Brewer . |
| 3,805,611 | 4/1974 | Hedland . |
| 3,889,535 | 6/1975 | Bull et al. .......................... 73/861.54 |

FOREIGN PATENT DOCUMENTS 1201441 8/1970 United Kingdom .

Primary Examiner—Herbert Goldstein
Attorney, Agent, or Firm—Arthur J. Hansmann

[57] ABSTRACT

An electric remote readout for fluid flow meters wherein a magnetic follower moves in accordance with the quantity of the fluid flowing through the meter and it carries electric contacts therewith. An electric resistor is positioned in contact with the electric contact to indicate the electric resistance in accordance with the position of the indicator. The resistor and the contact are of low friction material, and the resistor is adjustable in a general setting position as well as in a fine setting position by means of an adjusting screw. A remote electric readout is connected with the resistor an an electric conductor operating therewith, all to give a digital readout of the quantity of fluid flowing.

9 Claims, 5 Drawing Figures

FIG. 1

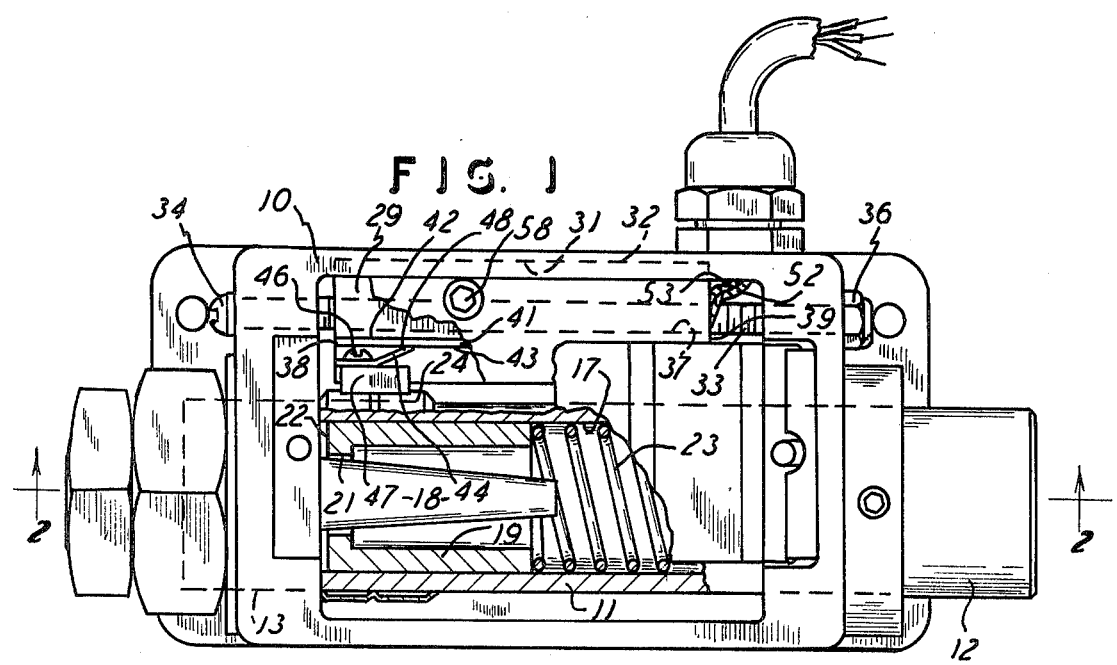
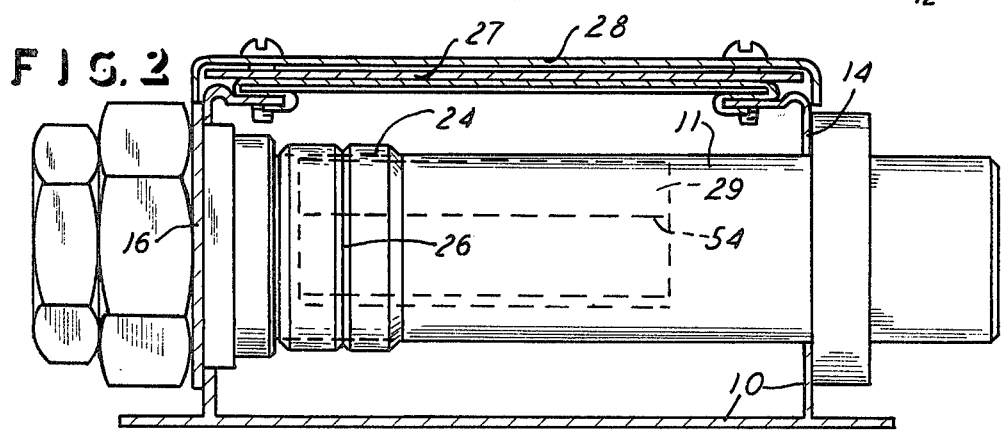
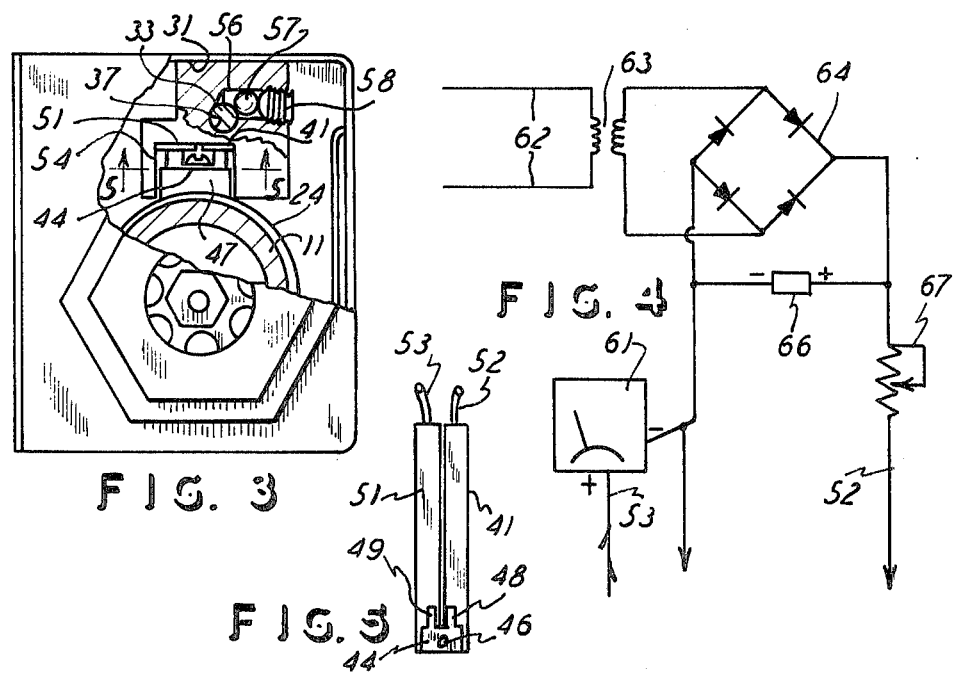

ELECTRIC REMOTE READOUT FOR FLUID FLOW METER

This invention relates to an electric remote readout for fluid flow meters, and, more particularly, it relates to an electrically operated readout unit which shows the quantity of flow through a fluid flow meter.

BACKGROUND OF THE INVENTION

The fluid flow meter utilized with the electric remote readout of this invention can be of the type shown in U.S. Pat. No. 3,805,611. In that arrangement, a magnetic member is disposed within the path of fluid flow and is displaced thereby, and a magnetic follower indicates the quantity of fluid flowing. The general concept of a remote display of the fluid flowing through a passageway is shown in U.S. Pat. Nos. 1,499,839 and 2,325,884 and 2,459,689 and 3,398,305 and Great Britain Pat. No. 1,201,441. In that type of prior art, a magnet is utilized for detecting the quantity of flow, and a readout or meter responsive to the magnet gives a digital readout of the flow.

The present invention differs from the prior art in that it provides highly sensitive apparatus which is therefore very accurate in displaying the quantity of fluid flowing through a meter. Further, the present invention provides for both a direct reading of the quantity of fluid flowing and for a remote reading of the quantity of the fluid flowing. That is, the direct reading is of a non-electric apparatus while the remote reading is an electric meter or the like. By utilizing a certain type of electric resistance element, in the nature of a potentiometer, the desired accuracy is attained since there is only a negligible amount of frictional resistance in the functioning of the electric resistance element which is under the influence of a magnet, but is completely and accurately movable therewith.

Still further, the present invention differs from the prior art in that it provides the aforementioned and also provides for adjustment of the meter for zeroing and the like. Still further, the adjustment can be both a factory type and an in-service type of adjustment and there are actually several possibilities or places for adjusting the apparatus of this invention, so that complete and most desirable adjustment can be accomplished.

BRIEF DESCRIPTION OF THE DRAWINGS

FIG. 1 is a top plan view of a flow meter with the electric readout elements of this invention, and with parts thereof removed.

FIG. 2 is a view taken substantially along the line 2—2 of FIG. 1.

FIG. 3 is an end elevational view of FIG. 1, with a corner thereof broken away and partly in section.

FIG. 4 is an electric schematic view of some of the electric elements.

FIG. 5 is a view of some of the electric elements as viewed along the line 5—5 of FIG. 3.

DETAILED DESCRIPTION OF THE PREFERRED EMBODIMENT

FIGS. 1, 2, and 3 show a type of fluid flow meter which is useful in detecting the quantity of fluid, such as liquid or gas, flowing therethrough. In that showing, the meter utilizes a magnet which is displaced in accordance with the quantity of fluid flowing, and the magnet, in turn, displaces a magnetic follower which aligns with a digital scale for indicating the flow quantity. Still further, the meter shown is generally of the type shown in U.S. Pat. No. 3,805,611.

Specifically, the meter has a body 10 which completely encloses the interior elements of the meter which include an elongated and tubular non-magnetic member 11 having its opposite ends 12 and 13 extend beyond the respective end walls 14 and 16 of the body 10. The member 11 has a hollow interior 17 which defines the fluid passageway through the meter, and, as shown in FIG. 1, the flow would be to the right. A tapered member 18 is fixedly mounted within the member 11 in the fluid passageway 17, and a cylindrical piston member 19 encircles the member 18 and has a fluid passageway 21 therein. Thus, fluid flowing against the piston head surface 22 will urge the piston to the right, as viewed in FIG. 1. A compression spring 23 forces against the piston 19 to urge it to the left, as viewed in FIG. 1. Thus, depending upon the quantity of fluid flowing through the meter, the piston 19 will move to the right and against the spring 23, all in accordance with the quantity of fluid flowing through the meter so that the linear displacement of the piston 19 is in direct proportion to the quantity of fluid flowing through the meter. The piston 19 is a magnetic member, and a magnetic follower 24 is disposed outside the member 11 and moves left and right in exact accordance with the movement of the piston 19. That is, the follower 24 is cylindrical and completely encircles the exterior cylindrical configuration of the member 11 and is snug therewith but slidable thereon. An indicator line 26 on the follower 24 is utilized to detect the exact position of the piston 19, and a digital scale 27 can thus provide a readout of the quantity of fluid flowing. Therefore, there can be a transparent cover 28 forming the top of the body 10, as seen in FIG. 2 only. This invention extends beyond the aforementioned in that it provides for a remote electric readout, in addition to the direct readout mentioned in connection with the indicator line 26 and the digital scale 27. An electric insulation support or block 29 is disposed in contact with the side wall 31 of the body 10, as seen in FIGS. 1, 2, and 3. The block 29 is elongated in the direction of the length of fluid flow, and it has a flat side surface 32 in flush and slidable contact with the wall 31, as shown. An adjustment member, in the form of a threaded screw 33, extends between the body end walls 14 and 16, and the screw has a head 34, and there is a nut 36 on the opposite end of the screw 33. The screw 33 extends through a cylindrical opening 37 extending throughout the length of the block 29, and the overall length of the block 29 is less than the distance between the walls 14 and 16 of the body 10. Therefore, the end surfaces 38 and 39 of the block 29 are spaced away from the end walls 14 and 16 as well as being spaced away from any other end obstructions. Therefore, it will be seen and understood that the block 29 can move to the left and right, as viewed in FIGS. 1 and 2, for adjustment hereinafter described. At this time it should be understood that the block cylindrical opening 37 is not a threaded opening and therefore does not make it a threaded, or any other axial limitation, relationship with the screw 33. That is, in certain conditions described hereinafter, the block 29 is free to slide along the screw 33 without requiring turning of the screw 33.

An electric resistor 41 is affixed to the bottom surface 42 of the block 29 and extends through the length thereof and presents a smooth electrically conductive surface 43 faced toward the indicator 24. Therefore, the resistor 41 extends parallel to the flow of fluid through the meter and is spaced from the member 11, as shown. An electric contact 44 is attached by means of a screw 46 to an electrically insulated block 47 suitably affixed to the indicator 24. As seen in FIGS. 1 and 3, the block 47 is off to the side, relative to the digital scale 27, and thus does not obscure the indicator line 26 relative to the scale 27.

It will therefore be seen and understood that with fluid flowing through the meter, the piston 19 is displaced to the right and the magnetic follower 24 is equally displaced to the right and carries the block 47 and contact 44 therewith to have the contact finger or end 48 slide along the resistor surface 43.

The contact 44 is shown in FIGS. 3 and 5 to include a U-shape which has another finger 49 in electric connection with the finger 48, and the finger 49 is in sliding contact with an electric conductor 51 extending separate from but adjacent and parallel to the resistor 41, as shown in FIGS. 3 and 5. Electric wires 52 and 53 are respectively connected with the resistor 41 and the conductor 51, and these wires extend exteriorally of the meter, as shown in FIG. 1.

Thus, with the arrangement described, the resistor 41 and conductor 51 serve as a potentiometer, and there is a low friction resistance provided for the fingers 48 and 49 to slide respectively along the resistor 41 and the conductor 51 so that complete and accurate tracking by the follower 24 relative to the piston 19 is achieved.

Also, the block 47 is nested within a rectangular opening 54 in the insulated block 29 so that the movable block 47 is closely guided in its linear movement but has no appreciable friction drag thereon. Also, it will be seen that the resistor 41 and conductor 51 are suitably affixed to the block 29 in that rectangular opening 54, as shown in FIGS. 1 and 3.

It will again be seen and understood that the movement of the block 29 will displace the resistor 41 and conductor 51, and thus the adjustment can be made by left and right movement of the block 29, as mentioned, since that movement alters the position of the resistor 41 relative to its contact finger 48. Block 29 has a cylindrical opening 56 in the side thereof, as seen in FIG. 3, and a deformable sphere 57 or the like is movably disposed in the opening 56 and is abutted by a screw 58 threaded into the opening 56. With that arrangement, when the screw 58 is backed away from the sphere 57, then the manual displacement of the block 29, as previously described, can be achieved without turning the screw 33. However, when the screw 58 is tightened onto the sphere 57, the sphere 57 is forced against the screw 33 and actually grips with the threads on the screw 33. Thus, upon turning the screw 33, the block 29 will be displaced since the sphere 57 will be displaced by the threads on the screw 33 to carry the block 29 with sphere 57. In that manner, a fine adjustment of the position of the block 29 can be achieved, and that adjustment can be made externally of the body 10, such as by the screwhead 34.

With the arrangement described, when the screw 58 is backed away from the sphere 57, the block 29 can be moved for a first adjustment, as described. Then, the set screw 58 can be forced against the sphere 57 which in turn will force against the screw 33 and cause the block 29 to be forced against the body wall 31 to therefore secure the block 29 in its then set position. Further, a second adjustment is possible, and that is when the screw 33 is turned against the deformable sphere 57 which may be made of nylon or the like. Of course the screw 33 is not threaded with any other member, and thus, when turning the screw 33 it will not move along its axis.

FIG. 4 shows the electric elements in the remote electric readout which includes an electric meter 61 suitably electrically connected with the wires 52 and 53 in any conventional arrangement. Wires 62 indicate the line voltage, and a transformer 63 and a conventional rectifier 64 are shown connected with the line. A capacitor 66 is also connected, and there is a potentiometer 67 available for adjusting the setting for the meter 61, when desired. With this arrangement, the wires 52 and 53 are connected into the electric schematic of FIG. 4, and the electric remote readout is available on the meter 61 to indicate the complete and accurate flow of fluid through the passageway 17.

What is claimed is:

1. A fluid flow meter with an electric remote readout, comprising a body, a non-magnetic member supported in said body and defining a space therewith and having a fluid-flow passage therethrough, a magnetic member movably disposed in said passage for movement in accordance with fluid flow in said passage, a spring operative on said magnetic member for yieldingly urging said magnetic member in one direction in said passage, a support on said body and disposed in said space and having an elongated recess faced toward said non-magnetic member, a cylindrical magnetic follower mounted on the exterior of said non-magnetic member and rotational thereon and for movement along with the movement of said magnetic member, an electric conductor and an electric resistor mounted on said support in said recess and adjacent said non-magnetic member and extending parallel thereto, a block on said follower and extending into said recess and slidably guided therealong without rotation, electric contacts mounted on said block for movement therewith and extending into respective sliding contact with said conductor and said resistor, an electric meter, and an electric connection extending between said conductor and said resistor and said meter for indicating the position of said contacts along said conductor and said resistor and thereby indicate the quantity of fluid flowing in said passage.

2. The fluid flow meter with an electric remote readout as claimed in claim 1, wherein said conductor and said resistor are adjustably positioned in the direction parallel to said passage for adjusting the reading on said electric meter.

3. The fluid flow meter with an electric remote readout as claimed in claim 1, wherein said support is movable in said space, and an adjustor interposed between said support and said body for effecting the adjustment of said conductor and said resistor.

4. The fluid flow meter with an electric remote readout as claimed in claim 3, wherein said adjuster includes a screw extending into said support.

5. The fluid flow meter with an electric remote readout as claimed in claim 4, wherein said screw extends externally of said body for rotation in the movement of said support.

6. The fluid flow meter with an electric remote readout as claimed in claim 4, including a movable member movably mounted on said support adjacent said screw and being movable toward and away from said screw for optional screwing engagement therewith, and with said support being freely slidable along said screw when said movable member is moved away from said screw.

7. The fluid flow meter with an electric remote readout as claimed in claim 6, wherein said movable member is of a deformable material for embedding against the threads of said screw when moved toward said screw.

8. In a fluid flow meter with an electric remote readout, a piece having a passage for the flow of fluid therethrough, a member movable in response to the fluid flow, the improvement comprising an electric resistor and an electric conductor mounted on said member adjacent said piece, electric contacts electrically connected together and in separate sliding contact with respective ones of said resistor and said conductor and being movable parallel to said passage in accordance with the movement of said member, electric wires respectively connected with said resistor and said conductor, an electric meter electrically connected with said contacts for indicating the flow of fluid, a movable support mounted adjacent said piece, said resistor and said conductor being mounted on said support, a screw extending into said support, a movable member movably mounted on said support adjacent said screw and being movable toward and away from said screw for optional screwing engagement therewith, and with said support being freely slidable along said screw when said movable member is moved away from said screw.

9. The fluid flow meter with an electric remote readout as claimed in claim 8, wherein said movable member is of a deformable material for embedding against the threads of said screw when moved toward said screw.

* * * * *